United States Patent
Cabral

(10) Patent No.: US 9,082,180 B2
(45) Date of Patent: Jul. 14, 2015

(54) SYSTEM, METHOD, AND COMPUTER PROGRAM PRODUCT FOR IMPLEMENTING A SPATIALLY VARYING UNSHARP MASK NOISE REDUCTION FILTER

(71) Applicant: NVIDIA Corporation, Santa Clara, CA (US)

(72) Inventor: Brian K. Cabral, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 139 days.

(21) Appl. No.: 13/730,654

(22) Filed: Dec. 28, 2012

(65) Prior Publication Data

US 2014/0185952 A1      Jul. 3, 2014

(51) Int. Cl.
*G06K 9/40* (2006.01)
*G06T 5/00* (2006.01)

(52) U.S. Cl.
CPC ............. *G06T 5/004* (2013.01); *G06T 2200/28* (2013.01); *G06T 2207/20012* (2013.01)

(58) Field of Classification Search
CPC ................. G06T 5/002–5/004; H04N 1/4092; H04N 1/58
USPC ............................ 382/261, 263, 266; 348/610
See application file for complete search history.

(56) References Cited

U.S. PATENT DOCUMENTS

| | | | |
|---|---|---|---|
| 5,363,209 A * | 11/1994 | Eschbach et al. | 358/445 |
| 2004/0071360 A1 * | 4/2004 | Maurer | 382/254 |
| 2006/0023965 A1 * | 2/2006 | Kimbell et al. | 382/260 |
| 2008/0298708 A1 * | 12/2008 | Ovsiannikov et al. | 382/261 |
| 2011/0075939 A1 * | 3/2011 | Chiou et al. | 382/224 |
| 2011/0123111 A1 * | 5/2011 | Sibiryakov et al. | 382/167 |

FOREIGN PATENT DOCUMENTS

EP            917347 A2 *    5/1999

OTHER PUBLICATIONS

Chandra et al. ("Dynamically optimized synchronous communication for low power system on chip designs," Proc. IEEE Int'l Conf. on Computer Design, 2003).*

* cited by examiner

*Primary Examiner* — Yubin Hung
(74) *Attorney, Agent, or Firm* — Zilka-Kotab, PC

(57) ABSTRACT

A system, method, and computer program product for applying a spatially varying unsharp mask noise reduction filter is disclosed. The spatially varying unsharp mask noise reduction filter generates a low-pass filtered image by applying a low-pass filter to a digital image, generates a high-pass filtered image of the digital image, and generates an unsharp masked image based on the low-pass filtered image and the high-pass filtered image. The filter also blends the low-pass filtered image with the unsharp masked image based on a shaping function.

17 Claims, 5 Drawing Sheets

SYSTEM, METHOD, AND COMPUTER PROGRAM PRODUCT FOR IMPLEMENTING A SPATIALLY VARYING UNSHARP MASK NOISE REDUCTION FILTER

FIELD OF INVENTION

The present invention relates to image processing, and more particularly to a spatially varying, sharpening, noise reduction filter.

BACKGROUND

Unsharp masking is a well-known image processing technique used to enhance high-frequency components (i.e., edges) of an image while suppressing some low amplitude noise. Typically, a low-pass filter is applied to the image to create a blurred version of the image. The low-pass filtered image is then compared to the original image to determine a difference between the low-pass filtered image and the original image. For each pixel of the original image, if the difference between the low-pass filtered image and the original image is above a threshold value that suppresses the low amplitude noise, then the difference is enhanced and combined with the low-pass filtered image to enhance the high frequency information in the image.

Conventional unsharp masking techniques apply the same filter kernel to the entire image. In many-cases, the noise varies spatially across the image such that the difference associated with the noisy pixels is above the threshold value implemented in the filter. In such cases, the noise may be enhanced thereby reducing the quality of the processed image. Thus, there is a need for addressing this issue and/or other issues associated with the prior art.

SUMMARY

A system, method, and computer program product for applying a spatially varying unsharp mask noise reduction filter is disclosed. The spatially varying unsharp mask noise reduction filter generates a low-pass filtered image by applying a low-pass filter to a digital image, generates a high-pass filtered image of the digital image, and generates an unsharp masked image based on the low-pass filtered image and the high-pass filtered image. The filter also blends the low-pass filtered image with the unsharp masked image based on a shaping function.

DETAILED DESCRIPTION

A spatially varying unsharp mask noise reduction filter is used to reduce noise in low frequency portions of the image while enhancing high-frequency information such as by increasing the acutance at the edges in the image. Conventional techniques for applying an unsharp mask blend the low-pass filtered version of the image with a scaled high-pass filtered version of the image. However, such techniques may enhance the amount of noise in the sharpened image.

Other implementations of the unsharp mask implement a coring technique, which compares the high-frequency components to a threshold value before combining the low-pass and scaled high-pass versions of the image. In other words, the high-pass filtered version of the image is combined with the low-pass filtered version of the image only if the high-pass signal is above a threshold value. However, these implementations either remove too much of the high pass signal, which removes too much edge information, or, conversely, leave too much noise in the image.

The spatially varying unsharp mask noise reduction filter, described more fully below, reduces the artifacts caused by this type of coring function. The sharpened image generated by conventional unsharp masking techniques is blended with the low-pass filtered image based on a shaping function of the high-pass signal. Various embodiments of the spatially varying unsharp mask noise reduction filter may be implemented in hardware, software, or combinations thereof. For example, in one embodiment, the spatially varying unsharp mask noise reduction filter may be implemented in an application specific integrated circuit (ASIC). In another embodiment, the spatially varying unsharp mask noise reduction filter may be implemented in software executed on a central processing unit (CPU). In yet other embodiments, at least a portion of the spatially varying unsharp mask noise reduction filter may be implemented in specialized software configured for execution in a highly parallel processor such as a graphics processing unit (GPU).

Figure 1:
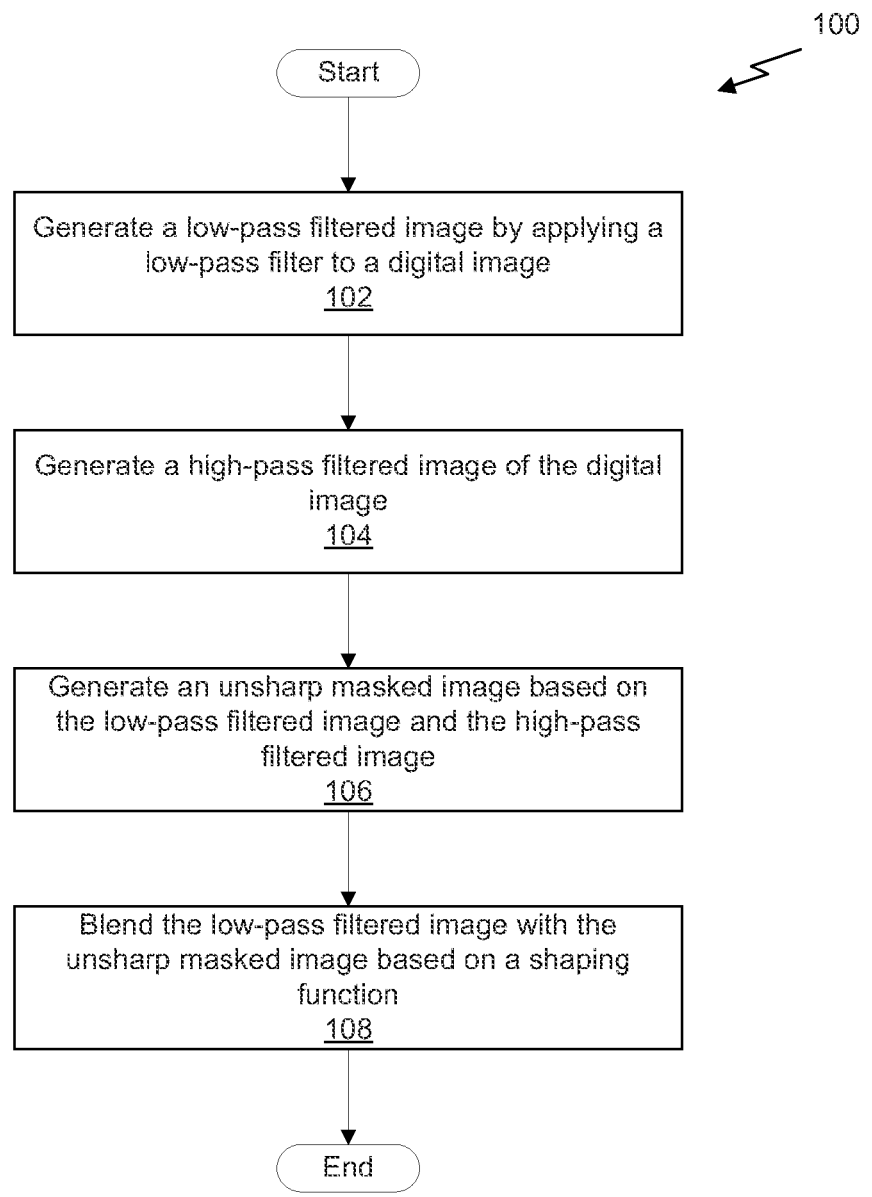
FIG. 1 illustrates a flowchart of a method for applying a spatially varying unsharp mask noise reduction filter to an image, in accordance with one embodiment.

FIG. 1 illustrates a flowchart of a method 100 for applying a spatially varying unsharp mask noise reduction filter to an image, in accordance with one embodiment. At step 102, a low-pass filter is applied to a digital image to generate a low-pass filtered image. In one embodiment, the spatially varying unsharp mask noise reduction filter implements a Gaussian filter that generates a filtered value for each pixel of the image by applying a convolution kernel to a window of neighboring pixels proximate to the pixel. At step 104, a high-pass filtered image of the digital image is generated. In one embodiment, the high-pass filtered image is generated by subtracting the low-pass filtered image from the digital image. The difference between the low-pass filtered image and the digital image comprises the high frequency components of the digital image. In another embodiment, the high-pass filtered image may be generated using a high-pass filter such as a sharpening filter based on a convolution kernel with negative weight values.

At step 106, an unsharp masked (USM) image is generated based on the low-pass filtered image and the high-pass filtered image. In one embodiment, the high-pass filtered image is scaled and then added to the low-pass filtered image to generate the USM image. In another embodiment, the scaled high-pass filtered image is only combined with the low-pass filtered image, at a particular pixel, if the difference between the pixel in the low-pass filtered image and the pixel in the digital image is above a threshold value. At step 108, the low-pass filtered image and the USM image are blended based on a shaping function to produce a sharpened version of the digital image. In one embodiment, the spatially varying unsharp mask noise reduction filter blends the low-pass filtered image and the USM image via a linear interpolation technique using a shaping function of the high-pass filtered image. It should be noted that, while various optional features are set forth herein in connection with the spatially varying unsharp mask noise reduction filter, such features are set forth for illustrative purposes only and should not be construed as limiting in any manner.

Figure 2A:
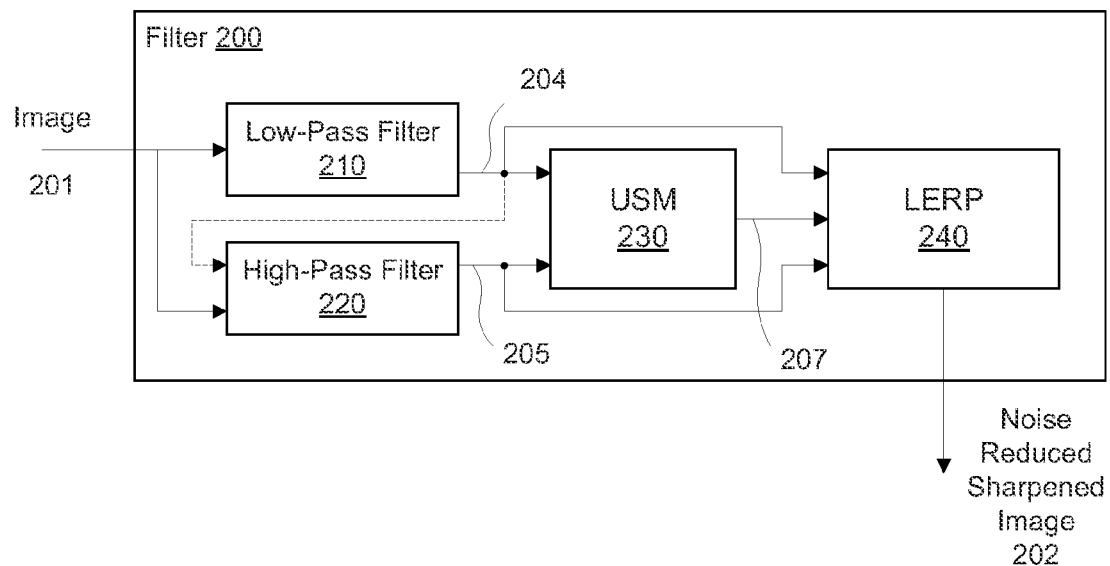
FIG. 2A illustrates a conceptual block diagram of a spatially varying unsharp mask noise reduction filter, in accordance with one embodiment.

FIG. 2A illustrates a conceptual block diagram of a spatially varying unsharp mask noise reduction filter 200, in accordance with one embodiment. As shown in FIG. 2A, the filter 200 includes a low-pass filter 210, a high-pass filter 220, an unsharp mask (USM) engine 230, and a linear interpolation (LERP) engine 240. Again, each of the elements of the filter 200 may be implemented in hardware, software, or combinations thereof. In one embodiment, the low-pass filter 210 implements a Gaussian low-pass filter by applying a convolution kernel to each pixel in the input image 201. In other words, for each pixel of the input image 201, the low-pass filter 210 applies a convolution kernel to a plurality of neighboring pixels in proximity to the pixel. The convolution kernel may be applied to filter window having a size such as a 3×3 block of pixels, a 5×5 block of pixels, a 7×7 block of pixels, etc. The convolution kernel computes a weighted average of the plurality of neighboring pixels in the filter window to generate a filtered value for the pixel. The weight applied to each neighboring pixel in the filter window is determined based on a Gaussian function, shown below as Equation 1, which decreases based on the distance of the neighboring pixel from the pixel.

$$G(x-x', y-y') = A \cdot e^{\frac{-(x^2+y^2)}{2\sigma^2}}$$ (Eq. 1)

As shown in Equation 1, x' is the x-coordinate of the pixel at the center of the filter window (i.e., the pixel that is to be replaced by the filtered value), y' is the y-coordinate of the pixel at the center of the filter window, x is the x-coordinate of the neighboring pixel, y is the y-coordinate of the neighboring pixel, the constant σ represents a standard deviation of a Gaussian distribution, and the constant A is equal to the result of the Gaussian function at (x, y) equal to (x', y'), which, in one embodiment, A is equal to one. Applying the convolution kernel to the input image 201 generates a blurred version of the image, i.e., low-pass filtered image 204. In alternative embodiments, the low-pass filter 210 may implement another type of low-pass filter such as by implementing bilinear interpolation, bicubic interpolation, or simple averaging convolution kernels.

It will be appreciated that the low-pass filter 210 may be implemented in hardware by designing an ASIC that receives pixel values of the input image 201 and generates blurred pixel values. The low-pass filter 210 may also be implemented as a hardware engine as part of a more generalized processor, such as by implementing a low-pass filter hardware engine within a GPU. Alternatively, the low-pass filter 210 may be implemented in software executed on generalized hardware such as a CPU. Efficiencies may be gained by generating specialized software that implements the convolution kernel on a plurality of parallel processing units such as within a GPU.

The filter 200 also includes a high-pass filter 220. In one embodiment, the high-pass filter 220 generates the high-pass filtered image by subtracting the low-pass filtered image 204 from the input image 201. In another embodiment, the high-pass filter 220 implements a high-pass filter by applying a convolution kernel to the input image 201. Unlike the convolution kernel of the low-pass filter 210, the convolution kernel of the high-pass filter 220 includes negative weights for some of the neighboring pixels. The convolution kernel weights are chosen to correspond with the convolution kernel of the low-pass filter 210 such that adding the low-pass filtered image 204 to the high-pass filtered image 205 generates a result that approximates the input image 201.

Once the filter 200 has generated the low-pass filtered image 204 and the high-pass filtered image 205, the USM engine 230 scales the high-pass filtered image 205 and combines the scaled high-pass filtered image with the low-pass filtered image 204 to generate a sharpened version of the input image 201, i.e., a classic USM image 207. In one embodiment, the USM engine 230 multiplies each pixel in the high-pass filtered image 205 by a scalar value, s, to generate an intermediate pixel value and adds the intermediate value to a corresponding pixel value in the low-pass filtered image 204. The calculation implemented by the USM engine 230 is illustrated by Equation 2, shown below.

$$P'(x,y) = P_{LP}(x,y) + s \cdot P_{HP}(x,y)$$ (Eq. 2)

As shown in Equation 2, $P_{LP}$ represents the low-pass filtered image 204, $P_{HP}$ represents the high-pass filtered image 205, and P' represents the USM image 207. In some embodiments, the USM engine 230 may implement a coring function, c(x), which combines the component of the pixel value from the high-pass filtered image 205 only if the high-pass signal is above a threshold value, τ, as illustrated in Equations 3 and 4 below.

$$P_{cored}'(x, y) = P_{LP}(x, y) + s \cdot c(P_{HP}(x, y)) \cdot P_{HP}(x, y)$$ (Eq. 3)

$$c(x) = \begin{cases} 0, & |x| < \tau \\ 1, & |x| \geq \tau \end{cases}$$ (Eq. 4)

The LERP engine 240 receives the USM image 207 and the low-pass filtered image 204 and generates the sharpened image 202. The LERP engine 240 blends the USM image 207 with the low-pass filtered image 204 based on a shaping function, α(x). In one embodiment, the blending function is a linear interpolation function based on a shaping function, $\alpha(P_{HP}(x, y)^{1/k})$, that takes the high-pass filtered image 205 as an input. Each pixel value of the high-pass filtered image is raised to the inverse power of a noise amplitude cutoff parameter. The blending function is illustrated below in conjunction with Equations 5 and 6.

$$P_S'(x,y) = lerp(P'(x,y), P_{LP}(x,y), \alpha(P_{HP}(x,y)^{1/k}))$$ (Eq. 5)

$$lerp(a,b,\alpha) = (1-\alpha) \cdot a + \alpha \cdot b$$ (Eq. 6)

As shown in Equation 5, $P_S'(x,y)$ represents the sharpened image 202 and constant k represents a noise amplitude cutoff parameter. The noise amplitude cutoff parameter is used to control the noise amplitude cutoff separately from the threshold value, τ, used in the USM engine 230. The shaping function may be any function with a range between zero and one (i.e., ϵ[0 . . . 1]). In one embodiment, the shaping function α(x) is equal to the Gaussian function G(x) illustrated by Equation 7.

In the context of the present description, the amplitude of the high pass signal for a particular pixel of the input, image 201 is defined as the magnitude of the difference between a pixel of the low-pass filtered image 204 and a corresponding pixel of the input image 201. As the amplitude of the high-pass signal increases, more of the classic USM image 207 is blended into the sharpened image 202. Conversely, as the amplitude of the high-pass signal decreases, more of the low-pass filtered image 204 is blended into the sharpened image 202. In other words, the spatially varying unsharp mask noise reduction filter 200 extends the conventional unsharp masking techniques by performing an additional step that blends the low-pass filtered image 204 with the USM image 207.

Figure 2B:
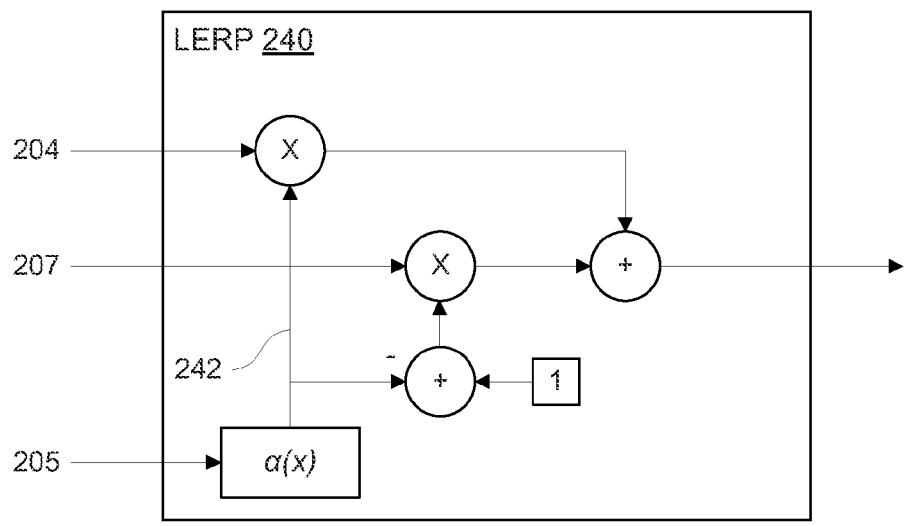
FIG. 2B illustrates the linear interpolation engine of FIG. 2A, in accordance with one embodiment.

FIG. 2B illustrates the LERP engine 240 of FIG. 2A, in accordance with one embodiment. The LERP engine 240 performs the additional blending step described above. As shown in FIG. 2B, the LERP engine 240 receives the low-pass filtered image 204 and the high-pass filtered image 205 as well as the USM image 207. The high-pass filtered image 205 is used to determine an interpolation value 242, a, that determines how the low-pass filtered image 204 and the USM image 207 are blended. In one embodiment, the LERP engine 240 uses a look-up table (LUT) to select the interpolation value 242. For each pixel of the high-pass filtered image 205, a pixel value is used as an index into the LUT to select the interpolation value 242. In another embodiment, the pixel value is used as a variable in a computation computed dynamically in order to calculate the interpolation value 242.

The LERP engine 240 multiplies the low-pass filtered image 204 by the interpolation value 242 to generate a first intermediate product and multiplies the USM image 207 by one minus the interpolation value 242 to generate a second intermediate product. The LERP engine 240 then sums the first intermediate product with the second intermediate product to generate the sharpened image 202. The LERP engine 240 illustrated in FIG. 2B implements the calculation shown in Equation 6, set forth above.

It will be appreciated that the computations described above in conjunction with FIGS. 2A and 2B are performed for each pixel of the corresponding images. For example, the calculations described by Equation 6 and illustrated in FIG. 2B are performed for each pixel of the low-pass filtered image 204 in conjunction with corresponding pixels of the high-pass filtered image 205 and the USM image 207. In one embodiment, the operations described herein may be performed for a plurality of pixels of the images in parallel. For example, a plurality of threads may be configured to perform the calculations for a corresponding plurality of pixels in parallel on a graphics processing unit (CPU).

In addition, the computations described above may be applied to each channel of an image separately. For example, the input image 201 may be formatted such that each pixel includes a red channel, a blue channel, and a green channel. In such cases, the spatially varying unsharp mask noise reduction filter 200 may be applied to each channel of the image separately and then the results may be combined. In another example, the input image 201 may be formatted in a YUV format. In such cases, the spatially varying unsharp mask noise reduction filter 200 may be applied to the luminance channel (i.e., the Y channel) while the chrominance channels are not filtered.

Again, the spatially varying unsharp mask noise reduction filter 200 described above may be implemented in hardware, software, or combinations thereof. More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
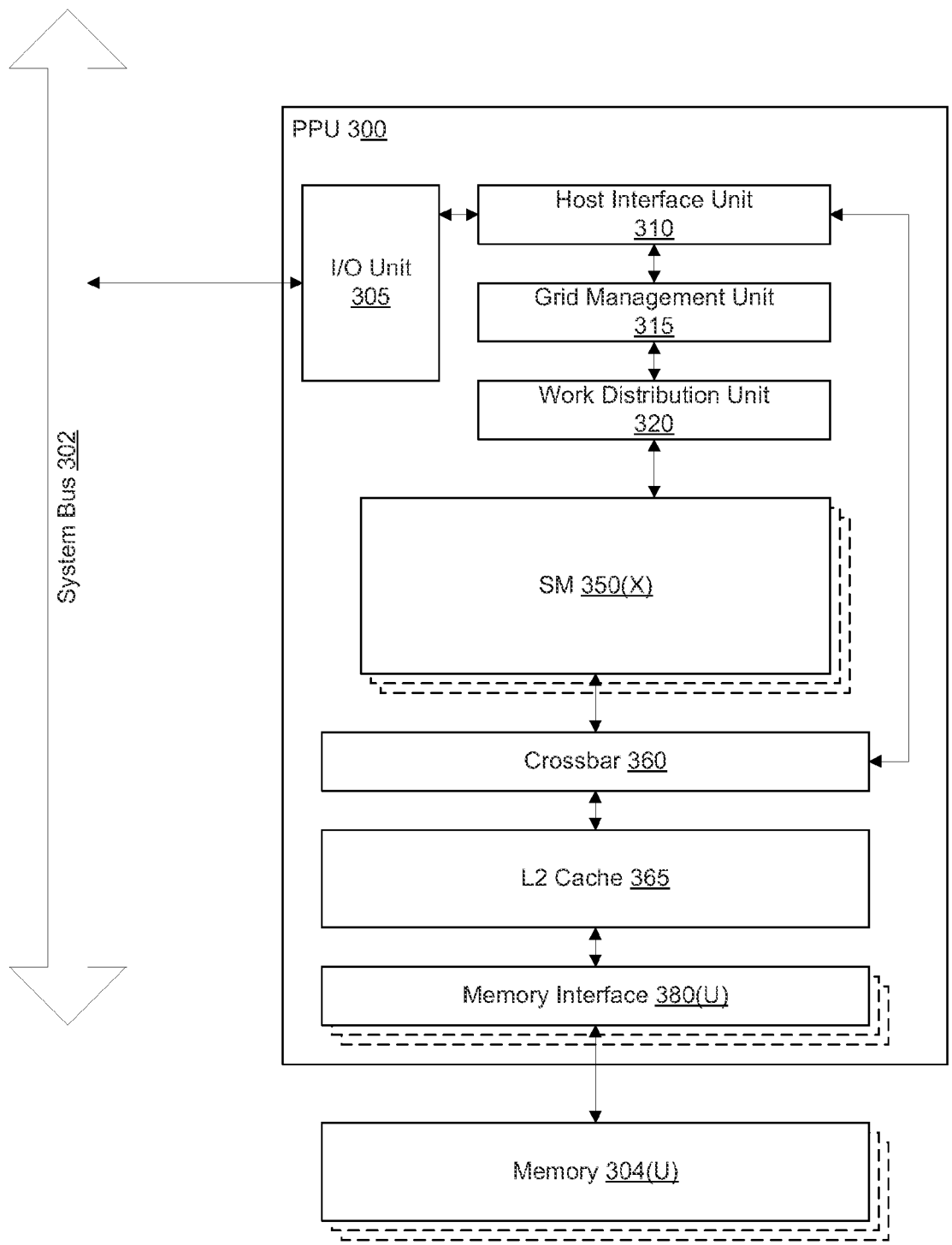
FIG. 3 illustrates a parallel processing unit, according to one embodiment.

FIG. 3 illustrates a parallel processing unit (PPU) 300, according to one embodiment. While a parallel processor is provided herein as an example of the PPU 300, it should be strongly noted that such processor is set forth for illustrative purposes only, and any processor may be employed to supplement and/or substitute for the same. In one embodiment, the PPU 300 is configured to execute a plurality of threads concurrently in two or more streaming multi-processors (SMs) 350. A thread (i.e., a thread of execution) is an instantiation of a set of instructions executing within a particular SM 350. Each SM 350, described below in more detail in conjunction with FIG. 4, may include, but is not limited to, one or more processing cores, one or more load/store units (LSUs), a level-one (L1) cache, shared memory, and the like.

In one embodiment, the PPU 300 includes an input/output (I/O) unit 305 configured to transmit and receive communications (i.e., commands, data, etc.) from a central processing unit (CPU) (not shown) over the system bus 302. The I/O unit 305 may implement a Peripheral Component Interconnect Express (PCIe) interface for communications over a PCIe bus. In alternative embodiments, the I/O unit 305 may implement other types of well-known bus interfaces.

The PPU 300 also includes a host interface unit 310 that decodes the commands and transmits the commands to the grid management unit 315 or other units of the PPU 300 (e.g., memory interface 380) as the commands may specify. The host interface unit 310 is configured to route communications between and among the various logical units of the PPU 300.

In one embodiment, a program encoded as a command stream is written to a buffer by the CPU. The buffer is a region in memory, e.g., memory 304 or system memory, that is accessible (i.e., read/write) by both the CPU and the PPU 300. The CPU writes the command stream to the buffer and then transmits a pointer to the start of the command stream to the PPU 300. The host interface unit 310 provides the grid management unit (GMU) 315 with pointers to one or more streams. The GMU 315 selects one or more streams and is configured to organize the selected streams as a pool of pending grids. The pool of pending grids may include new grids that have not yet been selected for execution and grids that have been partially executed and have been suspended.

A work distribution unit 320 that is coupled between the GMU 315 and the SMs 350 manages a pool of active grids, selecting and dispatching active grids for execution by the SMs 350. Pending grids are transferred to the active grid pool by the GMU 315 when a pending grid is eligible to execute, i.e. has no unresolved data dependencies. An active grid is transferred to the pending pool when execution of the active grid is blocked by a dependency. When execution of a grid is completed, the grid is removed from the active grid pool by the work distribution unit 320. In addition to receiving grids from the host interface unit 310 and the work distribution unit 320, the GMU 310 also receives grids that are dynamically generated by the SMs 350 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 300. An application may include instructions (i.e., API calls) that cause the driver kernel to generate one or more grids for execution. In one embodiment, the PPU 300 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 300 comprises X SMs 350 (X). For example, the PPU 300 may include 15 distinct SMs 350. Each SM 350 is multi-threaded and configured to execute a plurality of threads (e.g., 32 threads) from a particular thread block concurrently. Each of the SMs 350 is connected to a level-two (L2) cache 365 via a crossbar 360 (or other type of interconnect network). The L2 cache 365 is connected to one or more memory interfaces 380, Memory interfaces 380 implement 16, 32, 64, 128-bit data buses, or the like, for high-speed data transfer. In one embodiment, the PPU 300 comprises U memory interfaces 380(U), where each memory interface 380(U) is connected to a corresponding memory device 304(U). For example, PPU 300 may be connected to up to 6 memory devices 304, such as graphics double-data-rate, version 5, synchronous dynamic random access memory (GDDR5 SDRAM).

In one embodiment, the PPU 300 implements a multi-level memory hierarchy. The memory 304 is located off-chip in SDRAM coupled to the PPU 300. Data from the memory 304 may be fetched and stored in the L2 cache 365, which is located on-chip and is shared between the various SMs 350. In one embodiment, each of the SMs 350 also implements an L1 cache. The L1 cache is private memory that is dedicated to a particular SM 350. Each of the L1 caches is coupled to the shared L2 cache 365. Data from the L2 cache 365 may be fetched and stored in each of the L1 caches for processing in the functional units of the SMs 350.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 315 may configure one or more SMs 350 to execute a vertex shader program that processes a number of vertices defined by the model data. In one embodiment, the GMU 315 may configure different SMs 350 to execute different shader programs concurrently. For example, a first subset of SMs 350 may be configured to execute a vertex shader program while a second subset of SMs 350 may be configured to execute a pixel shader program. The first subset of SMs 350 processes vertex data to produce processed vertex data and writes the processed vertex data to the L2 cache 365 and or the memory 304. After the processed vertex data is rasterized (i.e., transformed from three-dimensional data into two-dimensional data in screen space) to produce fragment data, the second subset of SMs 350 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g. a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Figure 4:
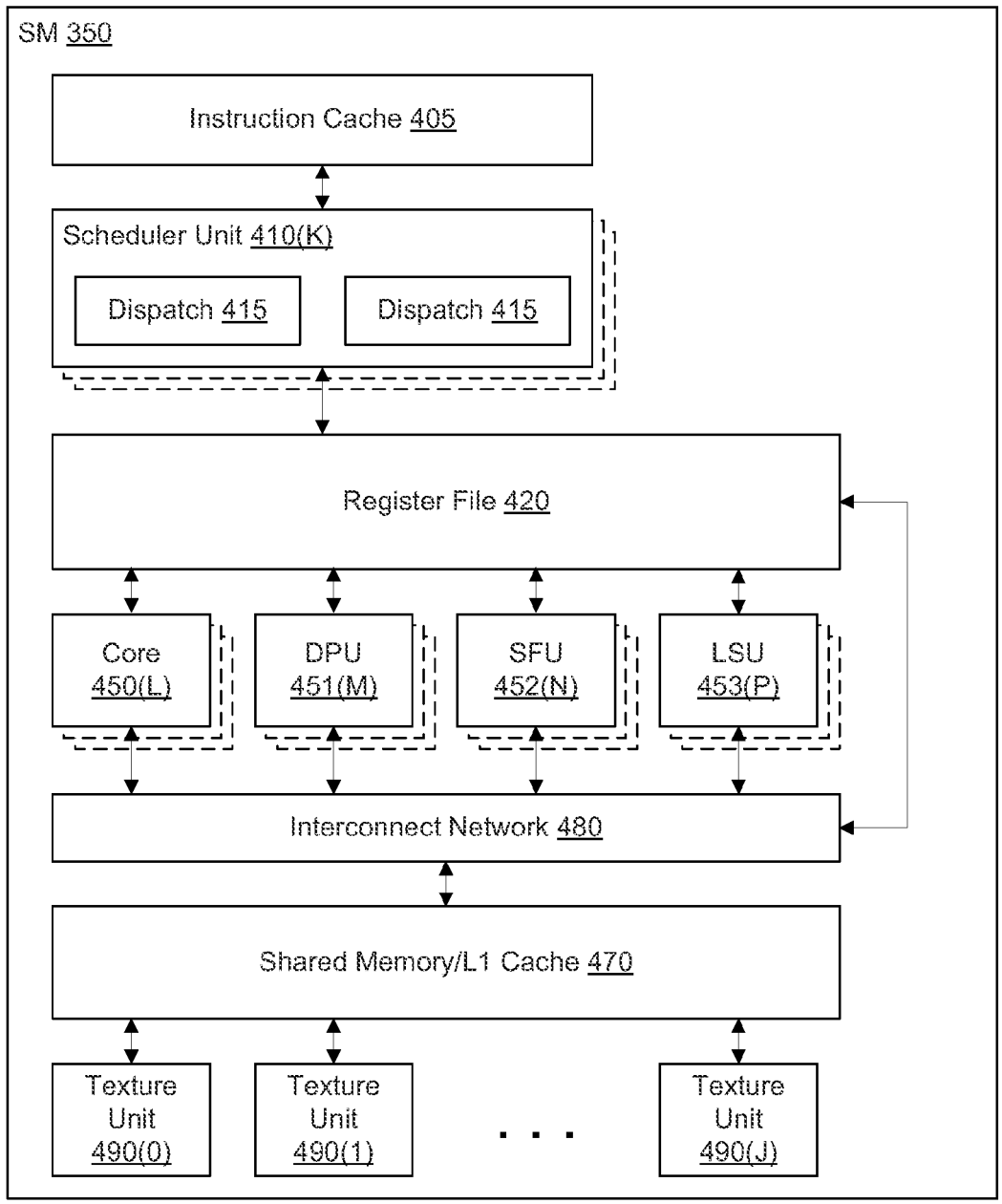
FIG. 4 illustrates the streaming multi-processor of FIG. 3, according to one embodiment.

FIG. 4 illustrates the streaming multi-processor 350 of FIG. 3, according to one embodiment. As shown in FIG. 4, the SM 350 includes an instruction cache 405, one or more scheduler units 410, a register file 420, one or more processing cores 450, one or more double precision units (DPUs) 451, one or more special function units (SFUs) 452, one or more load/store units (LSUs) 453, an interconnect network 480, a shared memory/L1 cache 470, and one or more texture units 490.

As described above, the work distribution unit 320 dispatches active grids for execution on one or more SMs 350 of the PPU 300. The scheduler unit 410 receives the grids from the work distribution unit 320 and manages instruction scheduling for one or more thread blocks of each active grid. The scheduler unit 410 schedules threads for execution in groups of parallel threads, where each group is called a warp. In one embodiment, each warp includes 32 threads. The scheduler unit 410 may manage a plurality of different thread blocks, allocating the thread blocks to warps for execution and then scheduling instructions from the plurality of different warps on the various functional units i.e., cores 450, DPUs 451, SFUs 452, and LSUs 453) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 350 includes a register file 420 that provides a set of registers for the functional units of the SM 350. In one embodiment, the register file 420 is divided between each of the functional units such that each functional unit is allocated a dedicated portion of the register file 420. In another embodiment, the register file 420 is divided between the different warps being executed by the SM 350. The register file 420 provides temporary storage for operands connected to the data paths of the functional units.

Each SM 350 comprises L processing cores 450. In one embodiment, the SM 350 includes a large number (e.g., 192, etc.) of distinct processing cores 450. Each core 450 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 350 also comprises M DPUs 451 that implement double-precision floating point arithmetic, N SFUs 452 that perform special functions (e.g., copy rectangle, pixel blending operations, and the like), and P LSUs 453 that implement load and store operations between the shared memory/L1 cache 470 and the register file 420. In one embodiment, the SM 350 includes 64 DPUs 451, 32 SFUs 452, and 32 LSUs 453.

Each SM 350 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

In one embodiment, the SM 350 is implemented within a GPU. In such an embodiment, the SM 350 comprises J texture units 490. The texture units 490 are configured to load texture maps (i.e., a 2D array of texels) from the memory 304 and sample the texture maps to produce sampled texture values for use in shader programs. The texture units 490 implement texture operations such as anti-aliasing operations using mip-maps (i.e., texture maps of varying levels of detail). In one embodiment, the SM 350 includes 16 texture units 490.

The PPU 300 described above may be configured to perform highly parallel computations much faster than conventional CPUs. Parallel computing has advantages in graphics processing, data compression, biometrics, stream processing algorithms, and the like.

Figure 5:
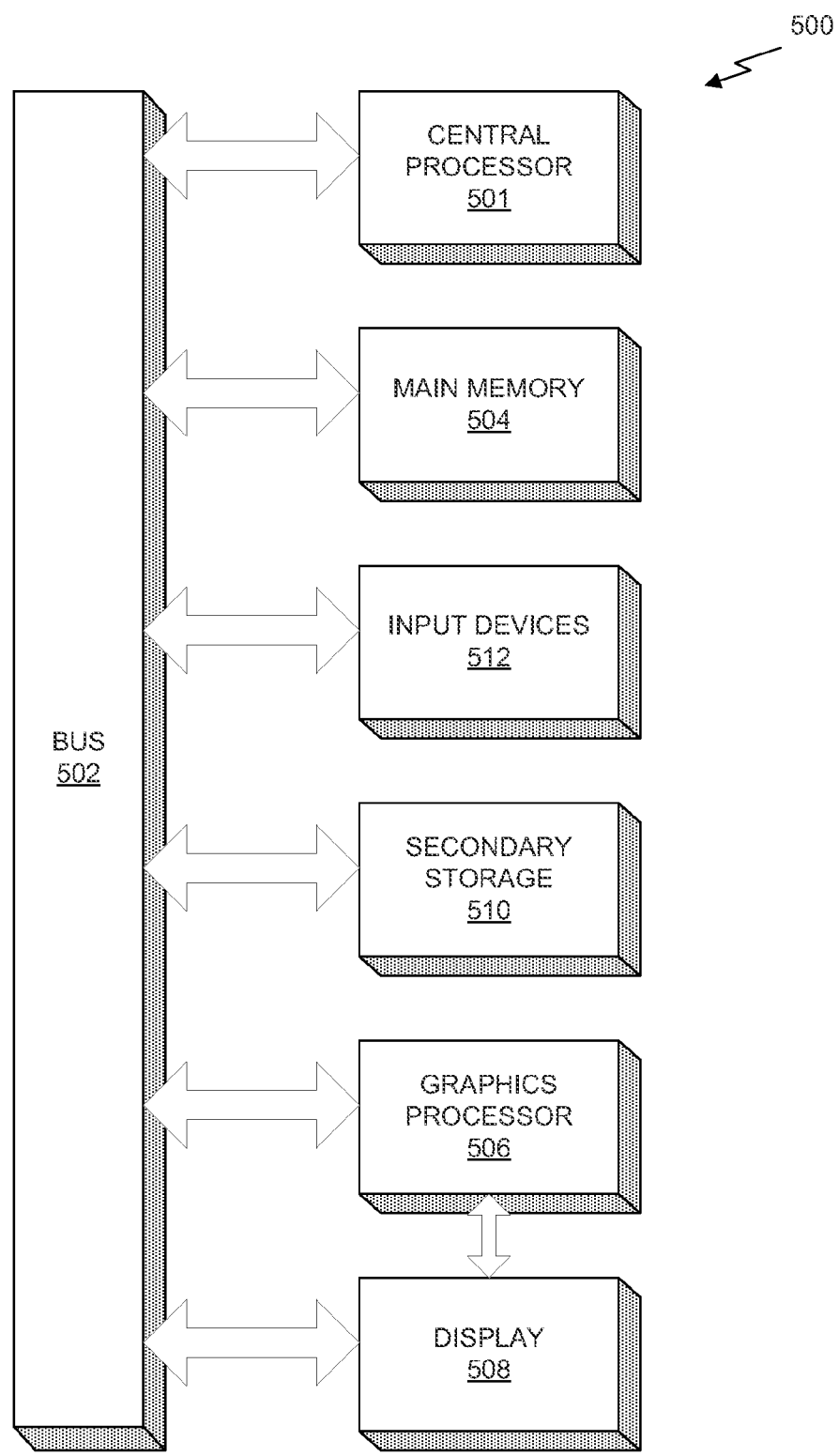
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    generating a low-pass filtered image by applying a low-pass filter to a digital image;
    generating a high-pass filtered image of the digital image;
    generating an unsharp masked image based on the low-pass filtered image and the high-pass filtered image; and
    blending the low-pass filtered image with the unsharp masked image based on a shaping function,
    wherein blending the low-pass filtered image with the unsharp masked image comprises performing a linear interpolation between the low-pass filtered image and the unsharp masked image based on the shaping function,
    wherein an input to the shaping function comprises a function of a pixel value of the high-pass filtered image, and wherein the input to the shaping function is based on a noise amplitude cutoff parameter.

2. The method of claim 1, wherein generating the high-pass filtered image comprises calculating the difference between the digital image and the low-pass filtered image.

3. The method of claim 1, wherein generating the unsharp masked image comprises combining the low-pass filtered image and a scaled version of the high-pass filtered image.

4. The method of claim 3, wherein generating the unsharp masked image comprises scaling the high-pass filtered image based on a coring function.

5. The method of claim 1, wherein the low-pass filtered image is generated by applying a convolution kernel to each pixel of the digital image.

6. The method of claim 5, wherein the convolution kernel is implemented in software configured to be executed on a graphics processing unit.

7. The method of claim 1, wherein a value returned by the shaping function is generated using a look-up table (LUT).

8. The method of claim 7, wherein an index into the LUT comprises a function of a pixel value of the high-pass filtered image.

9. The method of claim 7, wherein the LUT table represents a Gaussian function.

10. A non-transitory computer-readable storage medium storing instructions that, when executed by a processor, cause the processor to perform steps comprising:
   generating a low-pass filtered image by applying a low-pass filter to a digital image;
   generating a high-pass filtered image of the digital image;
   generating an unsharp masked image based on the low-pass filtered image and the high-pass filtered image; and
   blending the low-pass filtered image with the unsharp masked image based on a shaping function,
   wherein blending the low-pass filtered image with the unsharp masked image comprises performing a linear interpolation between the low-pass filtered image and the unsharp masked image based on the shaping function,
   wherein an input to the shaping function comprises a function of a pixel value of the high-pass filtered image, and
   wherein the input to the shaping function is based on a noise amplitude cutoff parameter.

11. The non-transitory computer-readable storage medium of claim 10, wherein blending the low-pass filtered image with the unsharp masked image comprises performing a linear interpolation between the low-pass filtered image and the unsharp masked image based on the shaping function.

12. The non-transitory computer-readable storage medium of claim 11, wherein an input to the shaping function comprises a function of a pixel value of the high-pass filtered image.

13. The non-transitory computer-readable storage medium of claim 10, wherein a value returned by the shaping function is generated using a look-up table (LUT).

14. A system, comprising:
   a memory storing a digital image; and
   a processing unit configured to:
      generate a low-pass filtered image by applying a low-pass filter to a digital image,
      generate a high-pass filtered image of the digital image,
      generate an unsharp masked image based on the low-pass filtered image and the high-pass filtered image, and
      blend the low-pass filtered image with the unsharp masked image based on a shaping function,
   wherein blending the low-pass filtered image with the unsharp masked image comprises performing a linear interpolation between the low-pass filtered image and the unsharp masked image based on the shaping function,
   wherein an input to the shaping function comprises a function of a pixel value of the high-pass filtered image, and
   wherein the input to the shaping function is based on a noise amplitude cutoff parameter.

15. The system of claim 14, wherein blending the low-pass filtered image with the unsharp masked image comprises performing a linear interpolation between the low-pass filtered image and the unsharp masked image based on the shaping function.

16. The system of claim 14, wherein the processing unit is a graphics processing unit.

17. The system of claim 16, wherein the processing unit is included in a system-on-chip (SoC) that further comprises a central processing unit.

\* \* \* \* \*